(12) United States Patent
Ding

(10) Patent No.: US 12,000,723 B2
(45) Date of Patent: Jun. 4, 2024

(54) METHOD AND APPARATUS FOR PRESSURE BASED MASS FLOW CONTROL

(71) Applicant: MKS Instruments, Inc., Andover, MA (US)

(72) Inventor: Junhua Ding, Boxborough, MA (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 17/651,751

(22) Filed: Feb. 18, 2022

(65) Prior Publication Data

US 2023/0266156 A1 Aug. 24, 2023

(51) Int. Cl.
*G01F 1/88* (2006.01)
*G01F 15/00* (2006.01)
*G05D 7/00* (2006.01)
*G05D 16/00* (2006.01)

(52) U.S. Cl.
CPC .............. *G01F 1/88* (2013.01); *G01F 15/005* (2013.01); *G01F 15/002* (2013.01); *G01F 15/003* (2013.01); *G05D 7/00* (2013.01); *G05D 16/028* (2019.01)

(58) Field of Classification Search
CPC ........ G01F 1/88; G01F 15/005; G01F 15/002; G01F 15/003; G05D 7/00; G05D 16/028
USPC ......... 137/12, 487.5; 73/861.42; 156/345.15, 156/345.24, 345.26; 118/715
See application file for complete search history.

(56) References Cited

U.S. PATENT DOCUMENTS

| | | | |
|---|---|---|---|
| 5,855,355 A * | 1/1999 | Grunert | G05D 7/0113 251/118 |
| 6,062,246 A | 5/2000 | Tanaka et al. | |
| 6,289,923 B1 * | 9/2001 | Ohmi | G05D 7/0635 251/118 |
| 6,422,256 B1 * | 7/2002 | Balazy | G05D 7/0635 137/12 |
| 6,539,968 B1 | 4/2003 | White et al. | |

(Continued)

FOREIGN PATENT DOCUMENTS

WO 2004/020956 A2 3/2004

OTHER PUBLICATIONS

Flow Measurement with LFEs, Laminar Flow Elements, TetraTec Instruments GmbH, 2 pages (2018).

(Continued)

*Primary Examiner* — Minh Q Le
(74) *Attorney, Agent, or Firm* — Hamilton, Brook, Smith & Reynolds, P.C.

(57) ABSTRACT

Mass flow controllers that can provide for improved bleeding time and can be manufactured with less complexity and cost are provided. A mass flow controller includes a body having a valve outlet bore defining a flow path and an adjustable valve configured to control flow of a gas through the flow path. A valve element includes an outlet orifice of the adjustable valve and is disposed within the bore. The mass flow controller further includes a pressure drop element disposed coaxially with the valve element within the bore. An upstream pressure sensor is configured to detect a pressure at a location in the flow path between the adjustable valve and the pressure drop element, and a controller is configured to determine a flow rate through the flow path based on pressure as detected by the upstream pressure sensor.

24 Claims, 4 Drawing Sheets

(56) References Cited

U.S. PATENT DOCUMENTS

| | | | |
|---|---|---|---|
| 6,631,334 | B2 | 10/2003 | Grosshart |
| 7,143,774 | B2 | 12/2006 | Lull et al. |
| 7,150,444 | B2 * | 12/2006 | Ohmi ................. F16K 7/14 251/118 |
| 7,874,208 | B2 | 1/2011 | Redemann et al. |
| 8,068,999 | B2 | 11/2011 | Wang et al. |
| 8,197,133 | B2 | 6/2012 | Schultz et al. |
| 8,504,318 | B2 | 8/2013 | Mendelson et al. |
| 8,887,549 | B2 | 11/2014 | Mendelson et al. |
| 9,188,989 | B1 | 11/2015 | Mudd et al. |
| 9,690,301 | B2 | 1/2017 | Mudd et al. |
| 9,562,796 | B2 | 2/2017 | Lull |
| 9,958,302 | B2 | 5/2018 | Mudd et al. |
| 10,114,385 | B2 | 10/2018 | Yasuda et al. |
| 10,514,712 | B2 | 12/2019 | Ding et al. |
| 10,801,867 | B2 | 10/2020 | Ding |
| 10,890,474 | B2 | 1/2021 | Bestic et al. |
| 11,003,198 | B2 | 5/2021 | Mudd et al. |
| 11,073,846 | B2 | 7/2021 | Lull et al. |
| 11,144,075 | B2 | 10/2021 | Mudd et al. |
| 11,365,830 | B2 * | 6/2022 | Watanabe .............. F16K 7/16 |
| 11,427,911 | B2 * | 8/2022 | Watanabe .............. F16K 11/04 |
| 2002/0083979 | A1 | 7/2002 | Suzuki |
| 2004/0083807 | A1 * | 5/2004 | Mudd .................... G01F 1/88 73/204.21 |
| 2011/0191038 | A1 | 8/2011 | Lull |
| 2016/0195415 | A1 * | 7/2016 | Lull ....................... G01F 1/50 73/861.01 |
| 2017/0060143 | A1 * | 3/2017 | Ding ...................... G01F 1/363 |
| 2017/0212531 | A1 * | 7/2017 | Nagase ................ G05D 7/0635 |
| 2017/0336810 | A1 * | 11/2017 | Altonji ................. G05D 7/0635 |
| 2018/0216976 | A1 * | 8/2018 | Mudd ................... G01F 15/002 |
| 2019/0178389 | A1 * | 6/2019 | Sawada ............... F16K 27/0236 |
| 2020/0033895 | A1 | 1/2020 | Sugita et al. |
| 2021/0318698 | A1 | 10/2021 | Lull et al. |
| 2022/0004209 | A1 | 1/2022 | Mudd et al. |
| 2022/0276664 | A1 * | 9/2022 | Price .................... F16K 31/007 |

OTHER PUBLICATIONS

Fujikin: Flow Control System, "Fujikin's FCS (Flow Control System) series leads the way in flow control technology." CAT:No. 712-01E-G, 12 pages, date unknown.

Horiba Semiconductor, Criterion, Digital Massflow Module D500, STEC Fluid Control Technology, date unknown.

Liso et al, "A New Differential Pressure Sensor Based Mass Flow Controller for Advanced Semiconductor Processing," Brooks Instrument, 5 pages, date unknown.

Fitch, J. S., et al., "Pressure-Based Mass-Flow Control Using Thermopneumatically-Actuated Microvalves", Proceedings sensors and actuators workshop, 1998, pp. 161-165.

International Search Report and Written Opinion received for PCT Patent Application No. PCT/US2023/061068, dated May 4, 2023, 17 pages.

* cited by examiner

METHOD AND APPARATUS FOR PRESSURE BASED MASS FLOW CONTROL

BACKGROUND

A semiconductor fabrication process can involve the delivery of several different gases and gas mixtures in various quantities over several processing steps. Generally, gases are stored in tanks at a processing facility, and gas metering systems are used to deliver metered quantities of gases from the tanks to processing tools, such as chemical vapor deposition reactors, vacuum sputtering machines, plasma etchers, etc. Other components, such as valves, pressure regulators, mass flow controllers (MFCs), mass flow ratio controllers (FRCs), mass flow meters (MFMs), mass flow verifiers (MFVs), and the like can be included in the gas metering system or in a flow path from the gas metering system to a processing tool. Components such as MFCs, FRCs, MFMs, and MFVs are provided to ensure the precise delivery of process gases.

A traditional pressure-based mass flow controller (PBMFC) includes a flow control valve and a pressure drop element, such as a flow nozzle, a laminar flow element, or a porous media flow restrictor. The MFC can measure flow rate with use of one pressure sensor when the flow nozzle is used and flow is under a critical flow condition, or with use of two pressure sensors under a non-critical flow condition. If a laminar flow element or a porous media flow restrictor is used as a pressure drop element, two pressure sensors are used to measure the flow rate.

SUMMARY

Improvements to pressure-based mass flow controllers are provided. The improved mass flow controllers can provide for reduced dead volume within the device, allowing for reduced bleeding time upon valve closure. The mass flow controllers can also be manufactured with reduced complexity and cost.

A mass flow controller includes a body having a valve outlet bore defining a flow path and an adjustable valve configured to control flow of a gas through the flow path. A valve element includes an outlet orifice of the adjustable valve and is disposed within the bore. The mass flow controller further includes a pressure drop element disposed coaxially with the valve element within the bore. An upstream pressure sensor is configured to detect a pressure at a location in the flow path between the adjustable valve and the pressure drop element, and a controller is configured to determine a flow rate through the flow path based on pressure as detected by the upstream pressure sensor.

The pressure drop element can be adjacent to the outlet orifice within the bore, disposed at a minimum distance within the bore with respect to the outlet orifice, or a combination thereof. For example, a volume between the pressure drop element and the outlet orifice within the bore can be less than about 0.05 $cm^3$. The bore can be substantially perpendicular to a surface of the body at which the adjustable valve is mounted. The pressure drop element can be or include a flow nozzle, a laminar flow element, a porous media flow restrictor, or a combination thereof.

The body can further define a pressure measurement conduit extending from the location in the flow path between the adjustable valve and the pressure drop element to a surface of the body. For example, the pressure measurement conduit can extend laterally from the bore to a surface of the body at which the upstream pressure sensor is mounted.

The mass flow controller can further include a downstream pressure sensor configured to detect a pressure downstream of the pressure drop element, and the controller can be further configured to determine the flow rate based on pressure as detected by the downstream pressure sensor.

The body can further include a controller inlet bore and a controller outlet bore, with the valve outlet bore being disposed generally transverse to at least one of the controller inlet and outlet bores. A valve actuator of the adjustable valve can drive a valve member (e.g., a valve plug or armature) in a direction coaxial with the valve outlet bore.

A mass flow controller includes a body defining a flow path and an adjustable valve configured to control flow of a gas through the flow path. The adjustable valve includes a pressure drop element disposed in an outlet orifice of the valve. The mass flow controller further includes an upstream pressure sensor configured to detect a pressure at a location in the flow path between an armature of the adjustable valve and the pressure drop element. A controller of the device is configured to determine a flow rate through the flow path based on pressure as detected by the upstream pressure sensor.

The outlet orifice of the valve can include a body defining a pressure measurement conduit disposed upstream of the pressure drop element. A pressure measurement conduit of the mass flow controller body can be in fluid communication with the pressure measurement conduit of the outlet orifice.

The mass flow controller can further include a downstream pressure sensor configured to detect a pressure downstream of the pressure drop element, and the controller can be further configured to determine the flow rate based on pressure as detected by the downstream pressure sensor.

The pressure drop element can be or include a flow nozzle, a laminar flow element, a porous media flow restrictor, or a combination thereof. A retainer can be disposed within the outlet orifice and configured to retain the pressure drop element. For example, the retainer can be configured to retain porous media of a porous media flow restrictor.

The body defining the flow path can include a valve outlet bore within which a valve element comprising the outlet orifice of the adjustable valve can be disposed. The body can further include a controller inlet bore and a controller outlet bore, with the valve outlet bore disposed generally transverse to at least one of the controller inlet and outlet bores. A linear valve actuator of the adjustable valve can drive a valve member in a direction coaxial with the valve outlet bore.

A method of assembling a mass flow controller includes disposing a pressure drop element and a valve element comprising an outlet orifice of an adjustable valve substantially coaxially within a body defining a flow path. The adjustable valve is configured to control flow of a gas through the flow path. The method further includes disposing an upstream pressure sensor at a pressure measurement conduit extending from the flow path to a surface of the body.

The pressure drop element can be disposed adjacent to the outlet orifice within the bore, at a minimum distance within the bore with respect to the outlet orifice, or a combination thereof. The pressure drop element and the outlet orifice of the adjustable valve can be integral.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

In pressure-based mass flow control, mass flow rate can be measured by a pressure sensor and a temperature sensor with a critical flow nozzle under a critical flow condition, or by two pressure sensors and a temperature sensor under a non-critical flow condition. With either approach, a pressure upstream of the flow nozzle is typically obtained for use in a flow calculation. Flow calculations for pressure-based mass flow control are generally known in the art.

Figure 1:
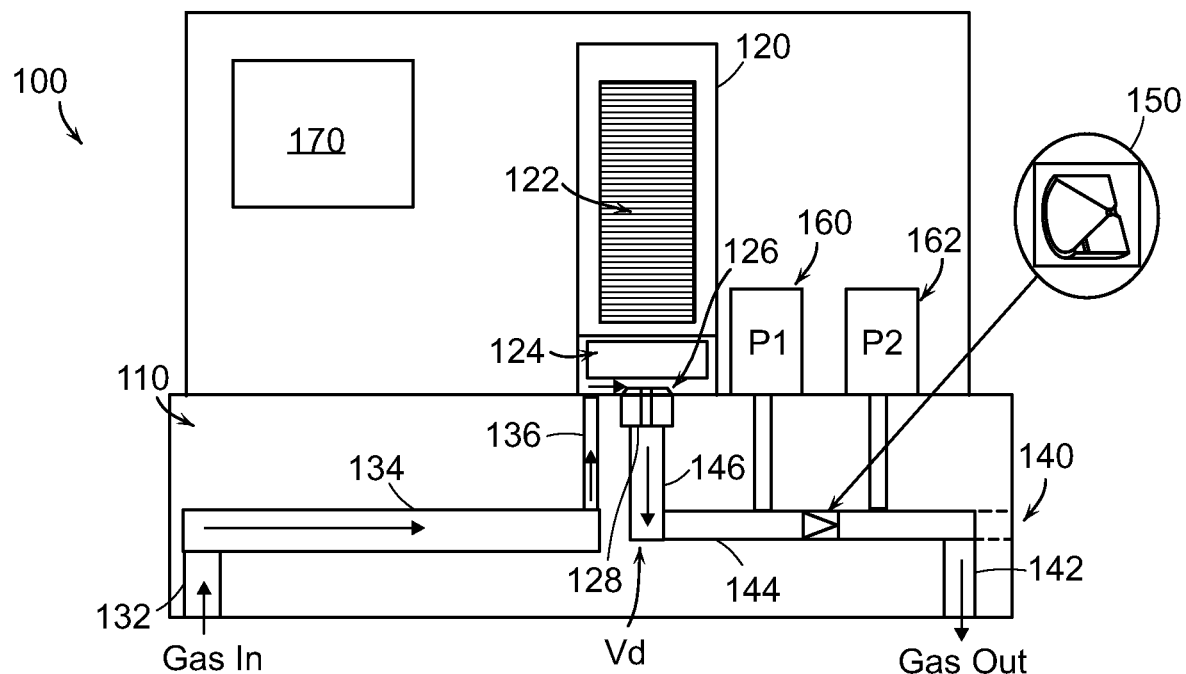
FIG. 1 is a schematic of a prior art pressure-based mass flow controller.

A prior art pressure-based mass flow controller (PBMFC) is shown in FIG. 1. The PBMFC 100 includes a body 110 to which a control valve 120 is mounted. The control valve includes a valve actuator 122 and a valve member 124 (e.g., a valve plug or armature). As illustrated, a valve element 126 comprising an outlet orifice 128 of the control valve is disposed within a bore 146 of the flow body 110; however, the valve element 126 can alternatively be sealed against the flow body 110. The PBMFC further includes a pressure drop element, e.g. a flow nozzle 150, with an upstream pressure sensor 160 and a downstream pressure sensor 162 disposed, respectively, upstream and downstream of the flow nozzle 150. A control processor 170 can be configured to operate the control valve 120 to adjustably control a flow of fluid through the device, obtain pressure measurements from pressure sensors 160 and 162, and obtain temperature measurements from a temperature sensor (not shown in FIG. 1). The flow body includes several bores 132, 134, 136, 146, 144, and 142 through which fluid may flow.

Residual gas in a dead volume (Vd) between the outlet orifice 126 of the control valve 120 and the flow nozzle 150 (i.e., in bores 146 and 144) can bleed out when the control valve 120 is closed. A bleeding time ($t_{bleeding}$) can be calculated by the following, where Cr is a conductance of the flow nozzle:

$$t_{bleeding} = 4*(Vd/Cr) \quad (1)$$

Figure 2:
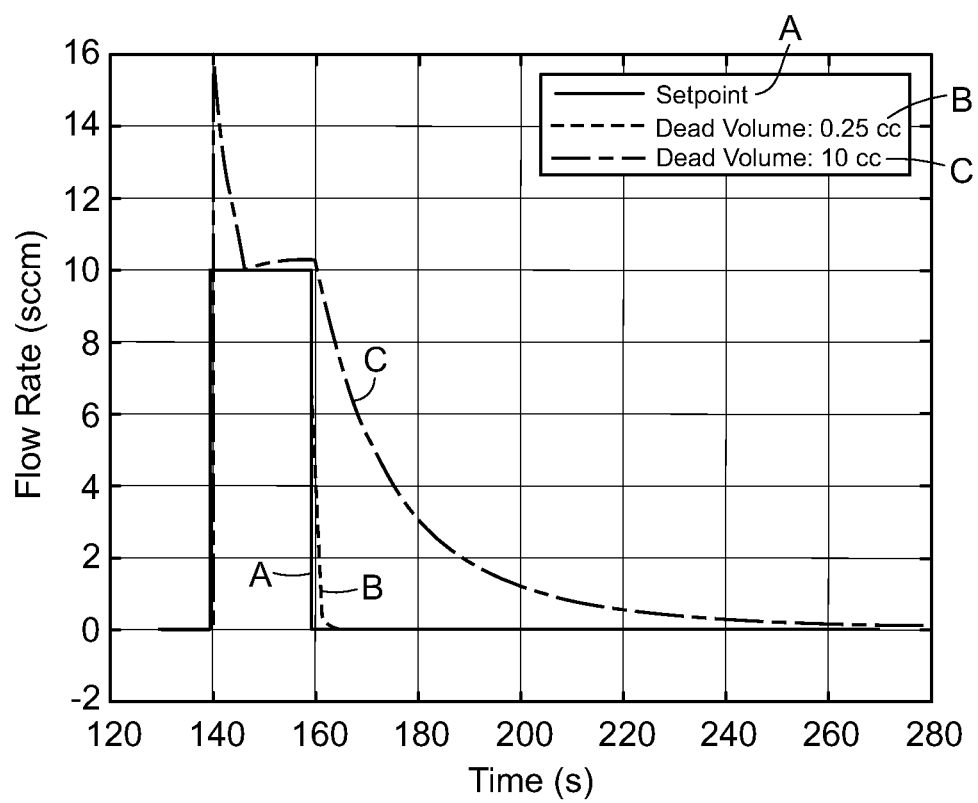
FIG. 2 is a graph illustrating an example response of the mass flow controller shown in FIG. 1.

For low flow applications (e.g., full scale flow<100 sccm), a conductance of the flow nozzle (Cr) is also generally small, which can result in a long bleeding time when the valve is closed. As shown in the example response illustrated in FIG. 2, with a dead volume of about 10 cc, a bleeding time can be about 120 seconds from valve closure, which can result in a significant amount of fluid flow to a processing chamber after a zero set point is provided.

During manufacturing of the device shown in FIG. 1, the flow body 110 is initially machined to include bores 132, 134, 136, 146, 144, and 142. The flow nozzle 150 is then inserted through an opening 140 at an edge of the flow body for mounting within the bore 144. After placement of the flow nozzle, the flow body returns to a machining process in which a metal plug is inserted into the bore 144 at the opening 140, as shown in dashed lines, to cap the open end of the body. The metal plug can then be welded to the flow body surface and polished. The device then returns to an assembly line for further assembling, such as for installation of pressure sensors and building of the control valve. The manufacturing cost of a PBMFC as shown in FIG. 1 is high due to the repeated machining and assembly processes and to ensure that the flow nozzle is not negatively impacted during the plugging process. As the flow nozzle is to provide an opening of precise, small dimension, exposure to dust and other particles during machining can create significant negative impact by blocking or partially blocking nozzle orifices. Typically, assembly steps of MFCs are performed in a clean room to be assembled in particle-free environments.

To overcome problems relating to bleeding times and manufacturing processes, improved PBMFCs are provided. In an improved PBMFC, a pressure drop element, such as a flow nozzle, is disposed in a same bore at which an outlet orifice of a flow control valve is disposed.

Figure 3:
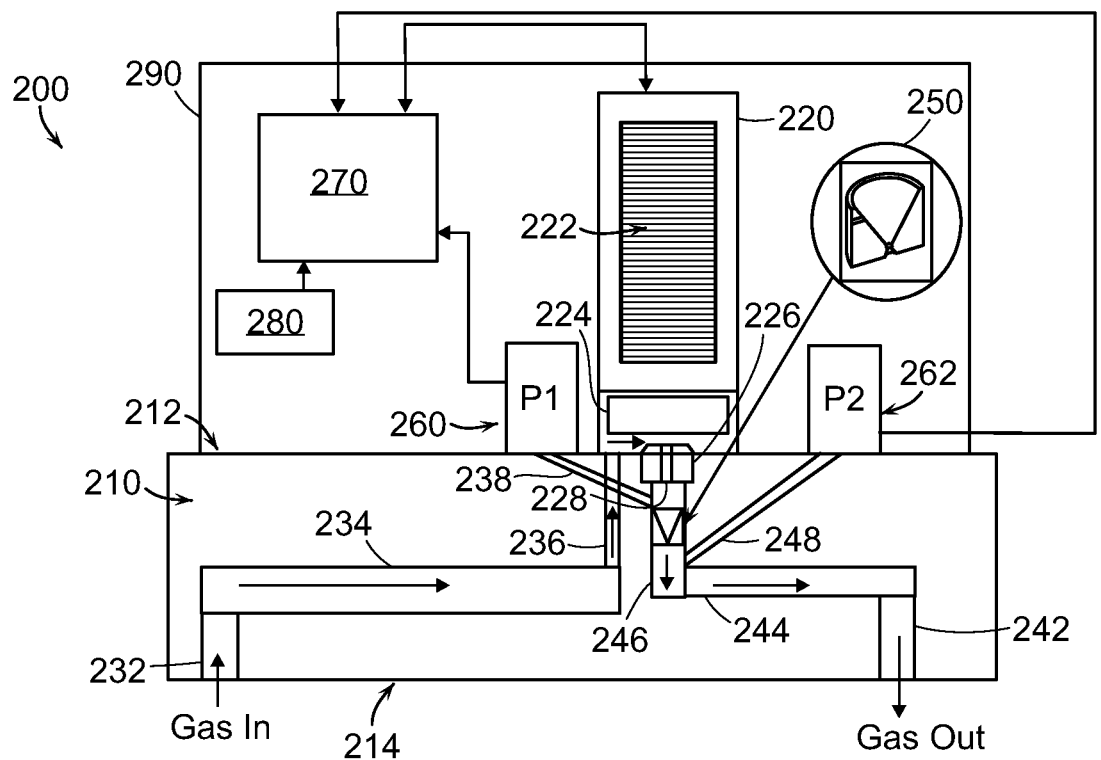
FIG. 3 is a schematic of an example pressure-based mass flow controller.

An example mass flow controller is shown in FIG. 3. The MFC 200 includes a body 210 having a valve outlet bore 246. An adjustable control valve 220 is configured to control a flow of fluid (e.g., gas) through a flow path at least partially defined by the bore 246. A valve element 226 that includes an outlet orifice 228 is disposed within the bore 246. A pressure drop element 250, illustrated as a flow nozzle, is disposed coaxially with the valve element 226 within the bore 246. The MFC further includes at least one pressure sensor, in particular, an upstream pressure sensor 260 configured to detect a pressure at a location in the flow path between the adjustable valve 220 and the pressure drop element 250. Optionally, a downstream pressure sensor 262 is included and configured to detect a pressure at a location downstream of the pressure drop element 250. A control processor 270 can be configured to determine a flow rate through the flow path based on pressure as detected by the upstream pressure sensor 260, and optionally, the downstream pressure sensor 262. The control processor 270 can further be configured to control a degree of opening or closing of the adjustable valve 220.

The control processor 270, adjustable control valve 220, and pressure sensors 260, 262 can be disposed within a housing 290 attached to the body 210. A temperature sensor 280 can be included within the housing or the body and configured to detect a temperature of the fluid travelling through the flow path.

As illustrated in FIG. 3, the pressure drop element 250 can be disposed adjacent to the outlet orifice 228 within the bore 246. The pressure drop element can be disposed at a minimum distance (e.g., less than about 0.05 cm$^3$) within the bore with respect to the outlet orifice to reduce a dead volume within the device. The minimum distance can be one that, for example, permits coupling of a pressure sensor to a volume between the outlet orifice and the pressure drop element. The body 210 can define pressure measurement conduit(s) 238, 248 to fluidly couple the pressure sensor(s) 260, 262 to respective measurement locations within the bore 246.

The bore 246 can be substantially perpendicular to a surface 212 of the body 210 at which the adjustable valve 220 is mounted. The pressure measurement conduit(s) 238, 248 can extend laterally from the bore 246 to the surface 212, at which the pressure sensor(s) 260, 262 can be mounted.

The body 210 can further include a controller inlet bore 234 and a controller outlet bore 244, with the valve outlet bore 246 disposed generally transverse to the controller inlet and outlet bores. Optionally, additional bores 232, 242 can be included to place an inlet and outlet of the device at a surface 214 that opposes surface 212 of the body, and bore 236 can be included to connect the controller inlet bore 234 to the control valve 220.

The adjustable control valve 220 can include a valve actuator 222 that drives a valve member 224 (e.g., a valve plug or armature) in a direction coaxial with the valve outlet bore 246.

As used herein, the term "adjustable control valve" refers to a valve that can provide for a controllable range of open states and excludes on/off-type valves. The openness of an adjustable control valve can be controlled in response to a control signal, and a flow rate through the valve can be controlled. Adjustable control valves can alternatively be referred to as proportional control valves.

Examples of suitable control valves for use as an adjustable control valve in the provided devices include solenoid valves, piezo valves, and step motor valves.

As described above with respect to FIG. 1, mass flow controllers generally include one adjustable control valve to control the flow of fluid through the system. Generally, the adjustable control valve and pressure sensors are mounted at one surface of a body that defines a flow path through the system. Optionally, additional valves, such as on/off valves, can be included in the system to isolate portions of a flow path through the system. Such additional valves increase a size and expense of the device. In addition to having the on/off valves as additional elements of the device, such devices typically require the body to define more circuitous or complicated flow paths than that shown in FIG. 3. An advantage of the configuration shown in FIG. 3 is that a reduced dead volume, which occurs in a portion of the flow path following the location of the adjustable control valve, can be accomplished without the inclusion of additional valves (e.g., on/off valves) and without more complicated flow paths needing to be defined within the body of the device.

By mounting the adjustable control valve to a surface of the body such that a valve member can be driven in a direction coaxial with a valve outlet bore, and with the inclusion of a pressure drop element coaxially disposed in the same bore, a significantly shortened and more easily manufactured flow path can be achieved than prior art devices.

Figure 4:
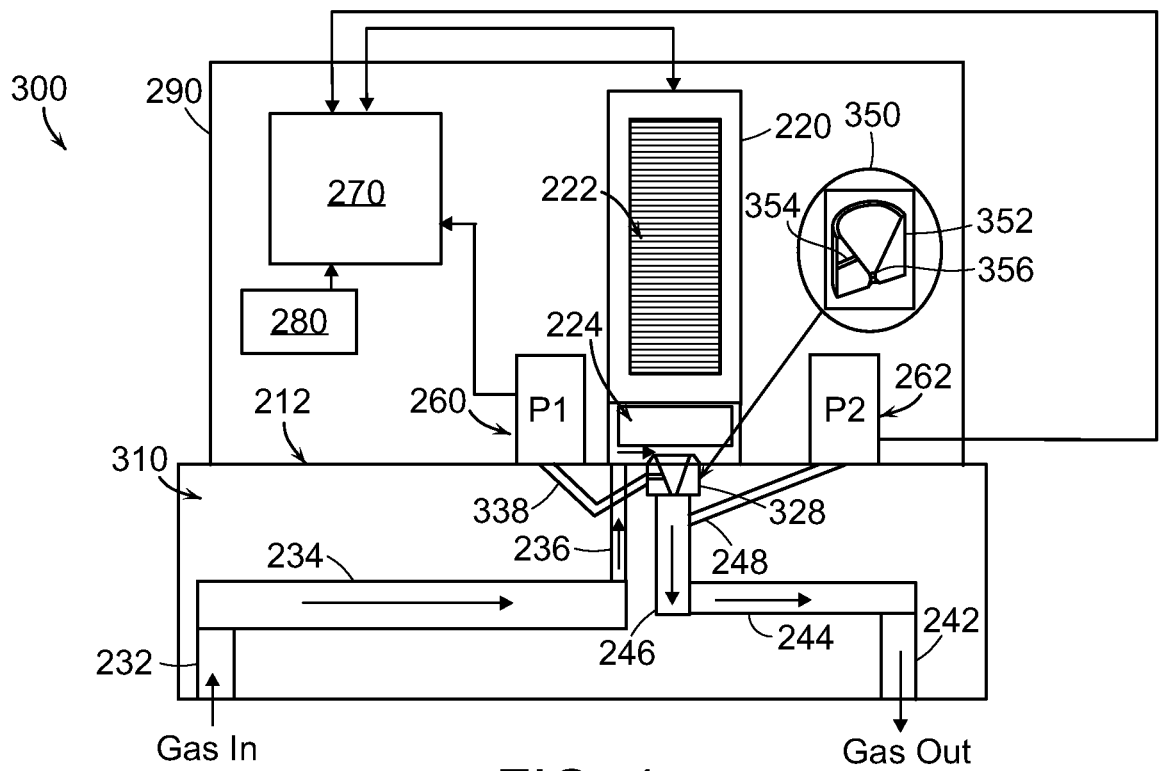
FIG. 4 is a schematic of another example pressure-based mass flow controller.

Another example mass flow controller is shown in FIG. 4, which includes some elements similar to those shown in FIG. 3 and labeled with like numbering. The MFC 300 includes a body 310 that defines a flow path (e.g., comprising valve outlet bore 246) and an adjustable valve 220 configured to control flow of a gas through the flow path. The adjustable valve 220 includes a pressure drop element 350 disposed in an outlet orifice 328 of the valve. An upstream pressure sensor 260 is configured to detect a pressure at a location in the flow path between a valve member 224 (e.g., a valve plug or armature) of the adjustable valve and the pressure drop element 350. A controller 270 can be configured to determine a flow rate through the flow path based on pressure as detected by the upstream pressure sensor 260, and optionally, the downstream pressure sensor 262.

The outlet orifice 328 can include a body 352 that defines a pressure measurement conduit 354 disposed upstream of the pressure drop element 350 or a portion 356 of the pressure drop element providing for the pressure drop (e.g., a narrow nozzle portion). The body 310 can define a pressure measurement conduit 338 in fluid communication with the pressure measurement conduit 354 of the outlet orifice. As illustrated, the pressure measurement conduit can extend laterally from the outlet orifice 328 to a surface 212 at which the pressure sensor 260 is mounted.

The pressure drop elements 250, 350 can be or include flow nozzles, laminar flow elements, and porous media flow restrictors. When included in an outlet orifice of an adjustable valve, a retainer (e.g., sleeve 455, FIG. 6B) can be disposed within the outlet orifice and configured to retain a porous media.

Examples of suitable flow nozzles include cone-shaped flow nozzles, tapered flow nozzles, and plates with orifice(s). Examples of suitable laminar flow elements include annulus elements, corrugated elements, single tubes, and bundled tubes. Examples of suitable porous media flow restrictors include porous sintered metal filters and porous ceramic filters.

Figure 5A:
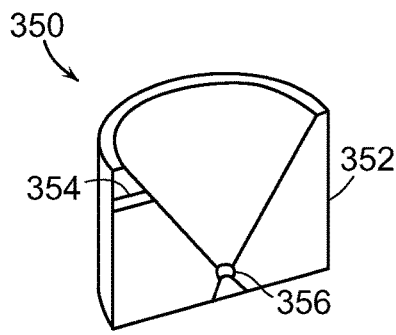
FIG. 5A is a cross-sectional perspective view of an example pressure drop element for inclusion in the device of FIG. 4.
Figure 5B:
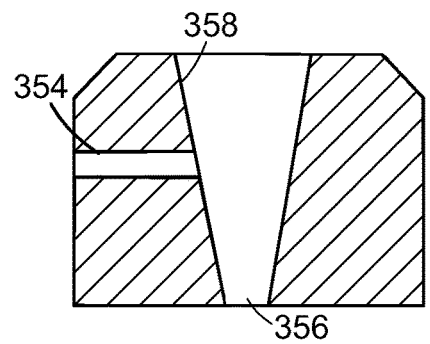
FIG. 5B is a cross-section view of an example flow nozzle for inclusion as a pressure drop element in the device of FIG. 4.
Figure 5C:
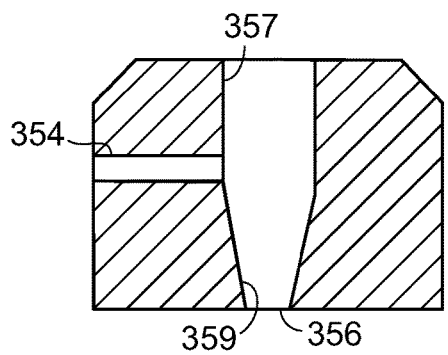
FIG. 5C is a cross-section view of another example flow nozzle for inclusion as a pressure drop element in the device of FIG. 4.

Example configurations of pressure drop elements for inclusion in an outlet orifice of an adjustable valve are shown in FIGS. 5A-7B. As illustrated in FIG. 5A, a pressure drop element 350 can be or include a flow nozzle, with a body 352 defining both a nozzle 356 and a pressure measurement conduit to enable fluidic communication with a pressure sensor to a location upstream of the nozzle 356. Additional example configurations of flow-nozzle-type pressure drop elements are shown in FIGS. 5B and 5C, in which a pressure measurement conduit 354 is defined at tapered wall 358 of the nozzle (FIG. 5B) or at a transition between a straight portion 357 and a tapered portion 359 of a wall of the nozzle (FIG. 5C).

Figure 6A:
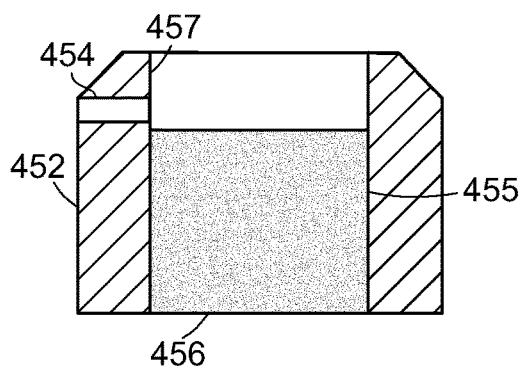
FIG. 6A is a cross-section view of an example porous media element for inclusion as a pressure drop element in the device of FIG. 4.
Figure 6B:
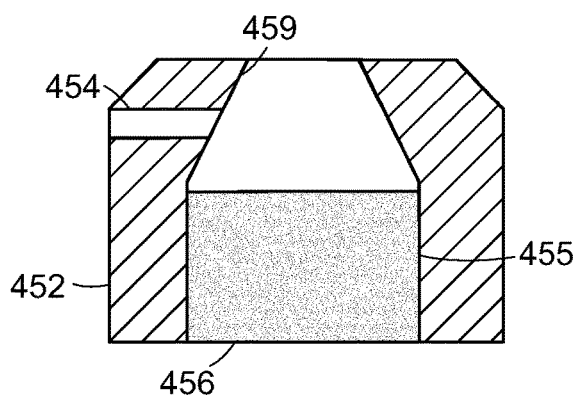
FIG. 6B is a cross-section view of another example porous media element for inclusion as a pressure drop element in the device of FIG. 4.

Example configurations of porous-media-type pressure drop elements are shown in FIGS. 6A and 6B. A body 452 can define a pressure measurement conduit at a straight portion 457 of a receptacle configured to retain a porous media 456 (FIG. 6A) or at a tapered portion 459 disposed upstream of the porous media 456 (FIG. 6B). A retainer 455, such as a sleeve, can be configured to retain the porous media within the element.

Figure 7A:
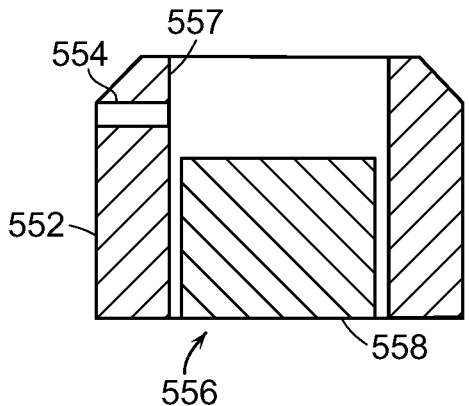
FIG. 7A is a cross-section view of an example laminar flow element for inclusion as a pressure drop element in the device of FIG. 4.
Figure 7B:
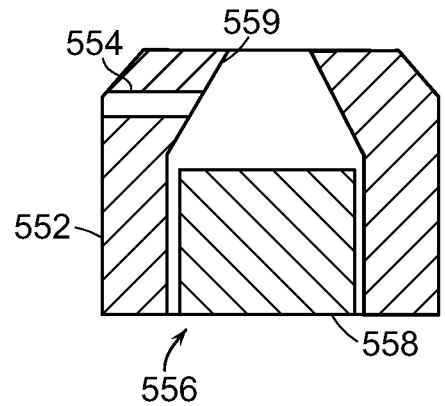
FIG. 7B is a cross-section view of another example laminar flow element for inclusion as a pressure drop element in the device of FIG. 4.

Example configurations of laminar-flow-type pressure drop elements are shown in FIGS. 7A and 7B. A body 552 can define a pressure measurement conduit 554 at a straight portion 557 of a wall of a laminar flow element 556 (FIG.

7A) or at a tapered portion 559 of a wall of a laminar flow element 556 (FIG. 7B). An annulus between the body 552 and a plug 558 forms the laminar flow path.

Figure 8:
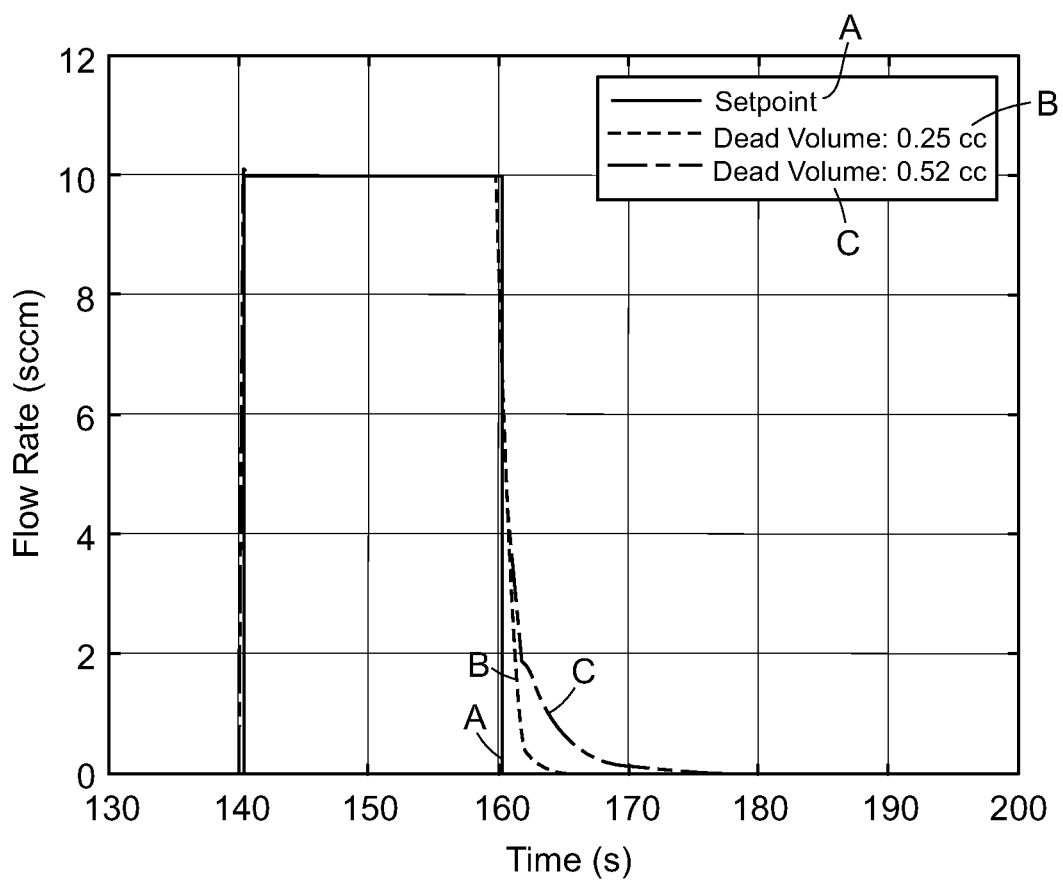
FIG. 8 is a graph illustrating an example response of a mass flow controller having a configuration as shown in FIG. 3 or 4.

An example response of bleeding times of MFCs as described above and shown in FIGS. 3 and 4 is shown in FIG. 8. For example, with a dead volume of about 0.25 cc, a bleeding time can be about 5 seconds from valve closure, and, with a dead volume of about 0.52 cc, a bleeding time can be about 15 seconds from valve closure. The estimated bleeding times are significantly improved from the bleeding times associated with the prior art MFC shown in FIG. 1.

Furthermore, the provided MFC configurations significantly reduce complexity and cost of manufacturing. The pressure drop element of the MFC can be disposed within the body of the device without requiring additional machining steps.

A method of assembling an MFC includes disposing a pressure drop element and a valve element comprising an outlet orifice of an adjustable valve substantially coaxially within a body defining a flow path. For example, the pressure drop element can be disposed adjacent to the outlet orifice within the bore, or the pressure drop element and the outlet orifice of the adjustable valve can be integral. The method further includes disposing an upstream pressure sensor at a pressure measurement conduit extending from the flow path to a surface of the body.

A control processor 270 of the MFC can be configured to control flow of a gas through a flow path based on flow rates determined from pressure and temperature readings. Methods of determining a flow rate with an upstream pressure sensor (e.g., sensor 260) under critical flow conditions and with both upstream and downstream pressure sensors (e.g., sensors 260, 262) under non-critical flow conditions are generally known in the art. Example methods of determining mass flow rates under choked flow and non-choked flow conditions are described in U.S. Pat. No. 10,514,712 the entire teachings of which are incorporated herein.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A mass flow controller, comprising:
a body having a valve outlet bore defining a flow path;
an adjustable valve configured to control flow of a gas through the flow path, a valve element comprising an outlet orifice of the adjustable valve, the valve element disposed within the bore;
a pressure drop element disposed coaxially with the valve element within the bore;
an upstream pressure sensor configured to detect a pressure at a location in the flow path between the adjustable valve and the pressure drop element; and
a controller configured to determine a flow rate through the flow path based on pressure as detected by the upstream pressure sensor.

2. The mass flow controller of claim 1, wherein the pressure drop element is adjacent to the outlet orifice within the bore.

3. The mass flow controller of claim 1, wherein the pressure drop element is disposed at a minimum distance within the bore with respect to the outlet orifice.

4. The mass flow controller of claim 1, wherein a volume between the pressure drop element and the outlet orifice within the bore is less than about 0.05 cm$^3$.

5. The mass flow controller of claim 1, wherein the bore is substantially perpendicular to a surface of the body at which the adjustable valve is mounted.

6. The mass flow controller of claim 1, wherein the body further defines a pressure measurement conduit extending from the location in the flow path between the adjustable valve and the pressure drop element to a surface of the body.

7. The mass flow controller of claim 6, wherein the pressure measurement conduit extends laterally from the bore to a surface of the body at which the upstream pressure sensor is mounted.

8. The mass flow controller of claim 1, further comprising a downstream pressure sensor configured to detect a pressure downstream of the pressure drop element, wherein the controller is further configured to determine the flow rate based on pressure as detected by the downstream pressure sensor.

9. The mass flow controller of claim 1, wherein the pressure drop element is a flow nozzle.

10. The mass flow controller of claim 1, wherein the pressure drop element is a laminar flow element.

11. The mass flow controller of claim 1, wherein the pressure drop element is a porous media flow restrictor.

12. The mass flow controller of claim 1, wherein the body further includes a controller inlet bore and a controller outlet bore, the valve outlet bore disposed generally transverse to at least one of the controller inlet and outlet bores.

13. The mass flow controller of claim 1, wherein a valve actuator of the adjustable valve drives a valve member in a direction coaxial with the valve outlet bore.

14. A mass flow controller, comprising:
a body defining a flow path;
an adjustable control valve configured to provide for a controllable range of open states and configured to control flow of a gas through the flow path, the adjustable control valve comprising an outlet orifice and a pressure drop element disposed in the outlet orifice of the adjustable control valve;
an upstream pressure sensor configured to detect pressure at a location in the adjustable control valve between an armature of the adjustable control valve and the pressure drop element; and
a controller configured to determine a flow rate through the flow path based on pressure as detected by the upstream pressure sensor.

15. The mass flow controller of claim 14, wherein the outlet orifice of the valve comprises a body defining a pressure measurement conduit disposed upstream of the pressure drop element.

16. The mass flow controller of claim 15, wherein the body defining the flow path further defines a pressure measurement conduit in fluid communication with the pressure measurement conduit of the outlet orifice.

17. The mass flow controller of claim 14, further comprising a downstream pressure sensor configured to detect a pressure downstream of the pressure drop element, wherein the controller is further configured to determine the flow rate based on pressure as detected by the downstream pressure sensor.

18. The mass flow controller of claim 14, wherein the pressure drop element is a flow nozzle.

19. The mass flow controller of claim 14, wherein the pressure drop element is a laminar flow element.

20. The mass flow controller of claim 14, wherein the pressure drop element is a porous media flow restrictor.

21. The mass flow controller of claim 14, further comprising a retainer disposed within the outlet orifice and configured to retain the pressure drop element.

22. The mass flow controller of claim 14, wherein the body defining the flow path comprises a valve outlet bore, a valve element comprising the outlet orifice of the adjustable valve disposed within the valve outlet bore.

23. The mass flow controller of claim 14, wherein the body further includes a controller inlet bore and a controller outlet bore, the valve outlet bore disposed generally transverse to at least one of the controller inlet and outlet bores.

24. The mass flow controller of claim 14, wherein a linear valve actuator of the adjustable valve drives a valve member in a direction coaxial with the valve outlet bore.

* * * * *